United States Patent [19]

Yoshino

[11] Patent Number: 4,901,239

[45] Date of Patent: Feb. 13, 1990

[54] ANTISKID DEVICE

[75] Inventor: Masato Yoshino, Itami, Japan

[73] Assignee: Sumitomo Electric Industries Ltd., Osaka, Japan

[21] Appl. No.: 193,055

[22] Filed: May 12, 1988

[30] Foreign Application Priority Data

May 20, 1987 [JP] Japan .................................. 62-126324

[51] Int. Cl.$^4$ ................................................ B60T 8/34
[52] U.S. Cl. ................................. 364/426.02; 303/97; 303/106
[58] Field of Search ....................... 364/426.02, 426.01, 364/426.03; 303/95, 97, 110, 99, 106, 109, 100

[56] References Cited

U.S. PATENT DOCUMENTS

| | | | |
|---|---|---|---|
| 4,395,761 | 7/1983 | Sato et al. ........................ | 364/426.02 |
| 4,511,971 | 4/1985 | Dittner et al. ................... | 364/426.02 |
| 4,660,896 | 4/1987 | Matsuda ............................ | 303/106 |
| 4,662,686 | 5/1987 | Matsuda ............................ | 303/106 |
| 4,682,295 | 7/1987 | Kubo .............................. | 364/426.02 |
| 4,704,684 | 11/1987 | Kubo .............................. | 364/426.02 |
| 4,750,124 | 6/1988 | Lin et al. ........................ | 364/426.02 |
| 4,761,741 | 8/1988 | Agarwal et al. ............... | 364/426.02 |
| 4,774,668 | 9/1988 | Matsubara et al. ........... | 364/426.02 |
| 4,790,607 | 12/1988 | Atkins ............................ | 303/109 |

Primary Examiner—Parshotam S. Lall
Assistant Examiner—Thomas G. Black
Attorney, Agent, or Firm—Cushman, Darby & Cushman

[57] ABSTRACT

An antiskid device including a wheel speed detecting device for detecting a speed of wheels of a motor vehicle, an arithmetic and detection device, a pressure control valve member provided for a brake fluid pressure circuit and an actuator for opening and closing the pressure control valve member. The arithmetic and detection device includes a control device which, when a deceleration of the wheels has exceeded a predetermined value from its peak, issues a command of maintaining a braking pressure of the wheels, at the time when the deceleration exceeds a reference value obtained by a linear function having the predetermined value as an initial value.

4 Claims, 3 Drawing Sheets

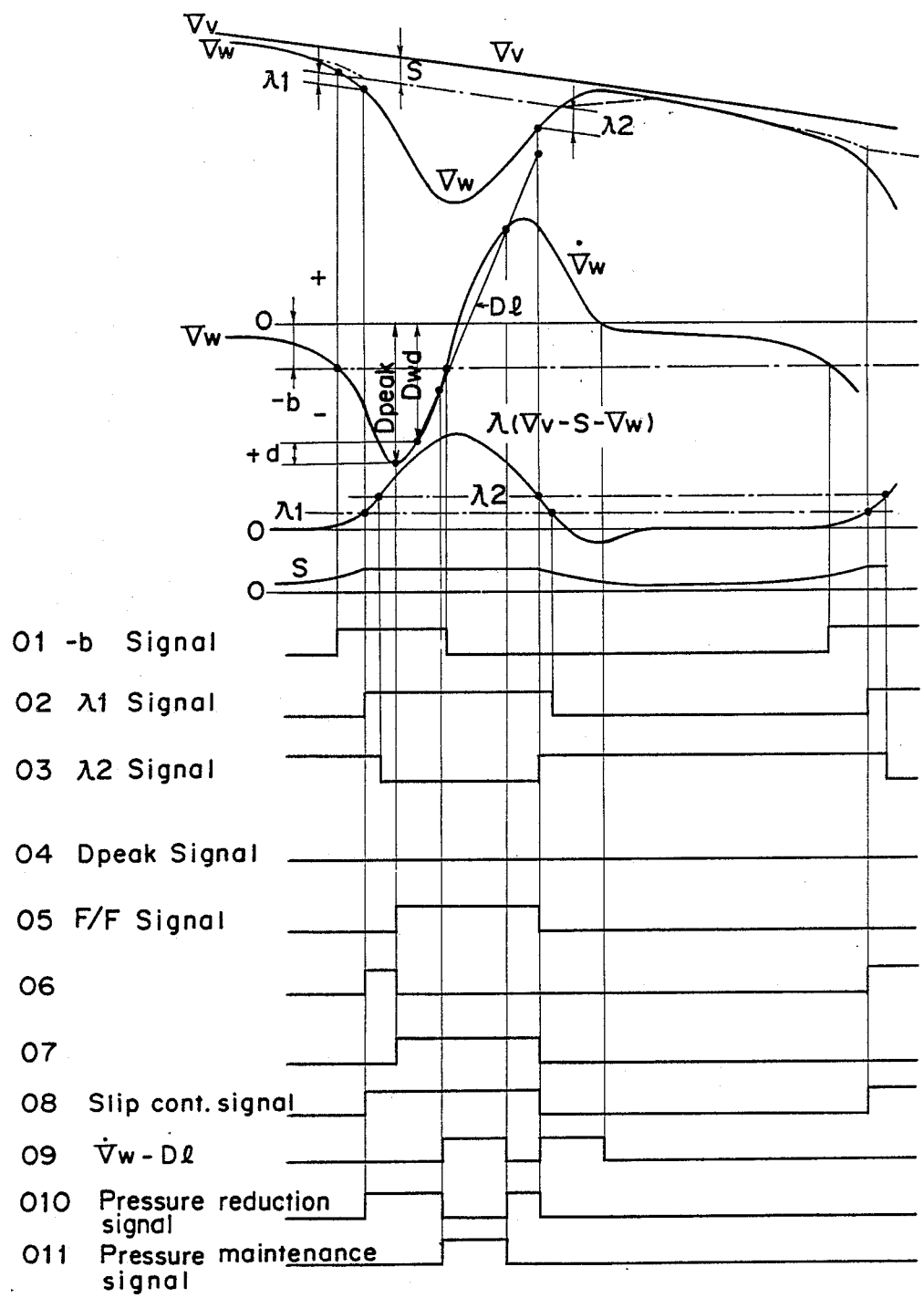

ANTISKID DEVICE

BACKGROUND OF THE INVENTION

The present invention generally relates to a motor vehicle and more particularly, to an antiskid device for utilizing a braking force efficiently through detection of a locking state of wheels of the motor vehicle.

Generally, an antiskid device is arranged as shown in FIG. 1. Initially, an AC voltage supplied from a wheel speed sensor R is converted into pulses by an interface circuit 22. The pulses are counted by a pulse processing circuit 23 so as to be input, as a wheel speed signal, to a circuit 24 for performing arithmetic operation and detecting a locking state of wheels of a motor vehicle. In this circuit 24, arithmetic operation of an estimated vehicle speed, a deceleration or an acceleration is performed on the basis of the wheel speed signal. When the circuit 24 detects that the wheels are in a state towards locking through comparison between the arithmetic results and various threshold values, the circuit 24 gives a command of reducing a braking pressure. Meanwhile, when the wheels are in a state towards recovery from locking, the circuit 24 issues a command of increasing the braking pressure. Furthermore, under a certain condition, the circuit 24 gives a command of maintaining the braking pressure even during issuance of the command of increasing or decreasing the braking pressure.

In the case where the command of decreasing the braking pressure has been given from the circuit 24, a solenoid driving circuit 25 energizes solenoids SOL1 and SOL2. Thus, pressure control valves V1 and V2 are displaced in the rightward direction in FIG. 1. Therefore, the pressure control valve V1 shuts off a brake fluid pressure circuit from a brake fluid pressure generator composed of a master cylinder 26 and an accumulator 29 and the pressure control valve V2 establishes communication of a brake fluid pressure circuit from a wheel cylinder 27 to a reservoir 28, while brake fluid discharged to the reservoir 28 by a pump 30 is returned to the accumulator 29 and the master cylinder 26. As a result, the braking pressure is decreased.

On the other hand, in the case where the command of increasing the braking pressure has been issued from the circuit 24, the solenoid driving circuit 25 de-energizes the solenoids SOL1 and SOL2, so that the pressure control valves V1 and V2 are returned to the positions shown in FIG. 1 and thus, the wheel cylinder 27 is communicated with the brake fluid pressure generator composed of the master cylinder 26 and the accumulator 29.

Meanwhile, when the command of maintaining the braking pressure has been given from the circuit 24, the solenoid driving circuit 25 energizes the solenoid SOL1 and de-energizes the solenoid SOL2. Thus, the pressure control valve V1 is displaced in the rightward direction in FIG. 1, while the pressure control valve V2 is held in the position shown in FIG. 1. Therefore, the wheel cylinder 27 is isolated from the brake fluid pressure generator, so that the pressure of the wheel cylinder 27 is contained in the circuit of the wheel cylinder 27 and thus, the braking pressure is maintained at a constant value.

A control means is provided in the antiskid device referred to above as disclosed, for example, in Japanese Patent Publication (examined) No. 30588/1984. In this prior art antiskid device, when the command of decreasing the braking pressure has been issued continuously for a first preset time period or more upon detection of the wheel state towards locking, the control means gives, for a second present time period after lapse of the first preset time period, the command of maintaining the braking pressure by suspending the command of decreasing the braking pressure. This action of the control means is performed for the following purpose. Namely, progress of decrease of the braking pressure is detected once in the course of decrease of the braking pressure and then, the braking pressure is further decreased if necessary such that a braking distance is shortened without decreasing the braking pressure excessively.

However, in the prior art antiskid device, if the braking pressure is maintained regardless of behaviors of the wheels upon lapse of the predetermined time period after start of decrease of the braking pressure as described above, such an undesirable phenomenon may take place that although the braking pressure is actually required to be decreased further, the wheels are locked exceedingly through maintenance of the braking pressure in too early a stage or conversely that in the case of the wheels which could have been recovered from locking even if the braking pressure had been maintained in an earlier stage, the braking pressure is decreased excessively since the braking pressure is maintained upon lapse of the predetermined time period.

SUMMARY OF THE INVENTION

Accordingly, an essential object of the present invention is, with a view to solving the above described problems, to provide an antiskid device which eliminates risks of excessive reduction of a braking pressure and maintenance of the braking pressure in too early a stage by properly changing, in response to behaviors of wheels, a point of time of starting maintaining the braking pressure during reduction of the braking pressure and a time period for maintaining the braking pressure during reduction of the braking pressure.

In order to accomplish this object of the present invention, in an antiskid device of the present invention, after a command of decreasing a braking pressure has been issued upon detection of a wheel state towards locking, a peak of a deceleration of the wheels is detected. Thus, when the deceleration of the wheels has exceeded a predetermined value from the peak, a command of maintaining the braking pressure is issued while the deceleration of the wheels exceeds a reference value for change of the deceleration, with the reference value being a linear function having the predetermined value as an initial value.

Among behaviors of the wheels, the deceleration represents rate of change of the wheel speed. Thus, when the deceleration has reached the peak, it is anticipated that the wheel speed substantially changes to a state towards recovery. Therefore, when the deceleration has exceeded the predetermined value from the peak, it can be decided that the wheel speed is positively changing to the state towards recovery. Subsequently, by setting a linear function having the predetermined value as an initial value and a proper gradient, the deceleration is compared with the linear function so as to determine whether or not the wheel speed changes to the state towards recovery normally. When not only the wheel speed has changed to the state towards recovery normally but the deceleration has exceeded the linear function, the command of maintaining the braking pressure is issued so as to suspend reduction of the braking pressure such that a waiting state is brought about.

BRIEF DESCRIPTION OF THE DRAWINGS

This object and features of the present invention will become apparent from the following description taken in conjunction with the preferred embodiment thereof with reference to the accompanying drawings, in which:

FIG. 3 is a timing chart of signals of the antiskid device of FIG. 1.

Before the description of the present invention proceeds, it is to be noted that like parts are designated by like reference numerals throughout several views of the accompanying drawings.

DETAILED DESCRIPTION OF THE INVENTION

Figure 1:
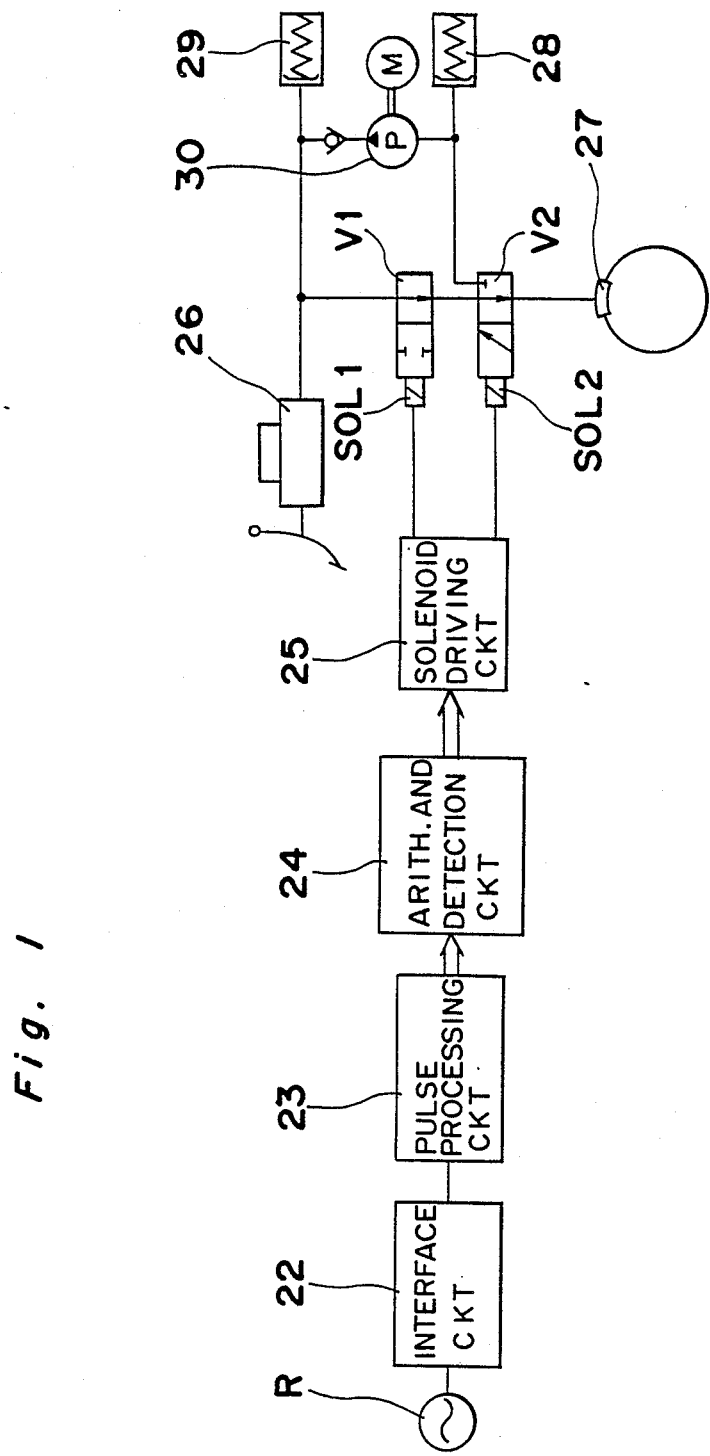
FIG. 1 is a schematic block diagram of an antiskid device according to one embodiment of the present invention.
Figure 2:
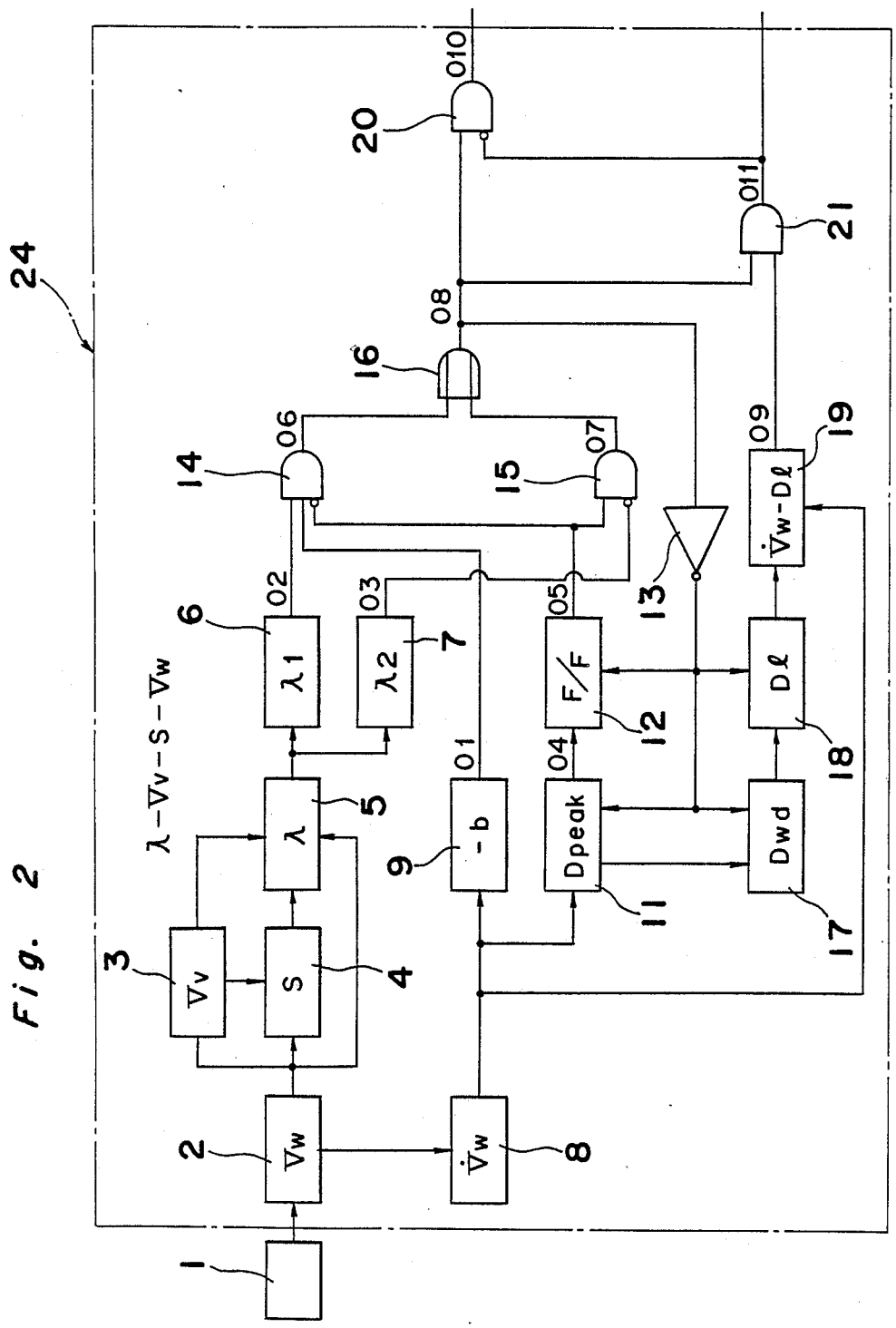
FIG. 2 is an electrical circuit diagram of the antiskid device of FIG. 1.

Referring now to the drawings, there is shown in FIGS. 1 to 3, an antiskid device according to one embodiment of the present invention. As shown in FIG. 1, the antiskid device includes a sensor R, an interface circuit 22, a pulse processing circuit 23, a circuit 24 for performing arithmetic operation and detecting a locking state of wheels of a motor vehicle, a solenoid driving circuit 25, a master cylinder 26, a wheel cylinder 27, a reservoir 28, an accumulator 29, a pump 30, solenoids SOL1 and SOL2 and pressure control valves V1 and V2. As shown in FIG. 2, a wheel speed detecting means 1 is constituted by the sensor R, the interface circuit 22 and the pulse processing circuit 23.

Since the present invention is characterized by the circuit 24, the circuit 24 is specifically described with reference to FIGS. 2 and 3, hereinbelow. The circuit 24 includes a wheel speed calculating circuit 2, a calculation circuit 3 for calculating an estimated vehicle speed Vv, a signal calculating circuit 4 for evaluating a slip speed of the wheels, a circuit 5, evaluation circuits 6 and 7, a differentiation circuit 8, a deceleration evaluating circuit 9 and a detection circuit 11 for detecting a peak of a deceleration of the wheels.

Furthermore, the circuit 24 includes a flip-flop 12, an inverter 13, AND gates 14 and 15, an OR gate 16, calculation circuits 17 and 18, a circuit 19 and AND gates 20 and 21. A pulse signal proportional to a rotational speed of the wheels is supplied from the wheel speed detecting means 1 to the wheel speed calculating circuit 2 which counts the number of pulses so as to output a wheel speed signal Vw. The calculation circuit 3 receives the signal Vw so as to calculate the estimated vehicle speed Vv. Meanwhile, in response to the wheel speed signal Vw and the vehicle speed signal Vv, the signal calculating circuit 4 calculates a signal S for evaluating the slip speed of the wheels. The circuit 5 receives these signals Vw, Vv and S so as to calculate and output a slip speed signal $\lambda$ (=Vv-S-Vw). Meanwhile, the signal S is obtained by filtering an actual slip speed of (Vv-Vw) but may not be used.

The above described signal $\lambda$ is applied to the evaluation circuits 6 and 7 which evaluate the signal $\lambda$ by a threshold value $\lambda 1$ for start of slip and a threshold value $\lambda 2$ for recovery of slip so as to output ON or OFF logical signals O2 and O3, respectively.

The wheel speed signal Vw is applied to the differentiation circuit 8 which calculates the deceleration of the wheels so as to obtain a deceleration signal $\dot{V}w$. The deceleration signal $\dot{V}w$ is supplied to the deceleration evaluating circuit 9 so as to be evaluated by a deceleration threshold value of $(-b)$ such that a result of the evaluation is output, as a logical signal O1, from the deceleration evaluating circuit 9. Meanwhile, the deceleration signal $\dot{V}w$ is applied to the detection circuit 11. Thus, when the detection circuit 11 has detected the peak of the deceleration, the detection circuit 11 outputs a signal O4 to the flip-flop 12 so as to set the flip-flop 12. Meanwhile, the circuit 11 and the flip-flop 12 are reset by a signal into which a signal O8 indicative of continuation of slip is inverted by the inverter 13 as will be described later.

Hereinbelow, operation of the antiskid device during deceleration is described. When the wheel speed signal Vw starts decreasing upon actuation of the brake, the circuit 3 generates the predetermined estimated vehicle speeds signal Vv. In response to the signals Vv and Vw, the circuit 4 calculates the signal S for evaluating the slip speed and the circuit 5 calculates the slip speed signal $\lambda$.

When this signal $\lambda$ has exceeded the predetermined value $\lambda 1$, the circuit 6 turns on the signal O2. Furthermore, the deceleration signal $\dot{V}w$ which is obtained by differentiating the wheel speed signal Vw is evaluated by the circuit 9. When the deceleration signal $\dot{V}w$ is smaller than the predetermined value of $(-b)$, the circuit 9 turns on the signal O1. Meanwhile, since the peak of the deceleration does not yet appear, the signal O4 is turned off thus, the signal O5 is also held in the OFF state. Therefore, the output signal O6 of the AND gate 14 is turned on. However, when the peak Dpeak of the deceleration has been detected by the detection circuit 11, the peak detection signal O4 is turned on so as to actuate the flip-flop 12 such that the signal O5 is turned on, so that the output signal O6 of the AND gate 14 is turned off. The output signal O5 of the flip-flop 12 is input to the AND gate 15, while the output terminal of the circuit 7 is connected to a NOT terminal of the AND gate 15. At this time, since the signal O5 of the flip-flop 12 is in the ON state. Meanwhile, since the slip speed signal $\lambda$ is not lower than the threshold value $\lambda 2$ for recovery of slip, the output signal O3 of the evaluation circuit 7 is in the OFF state. Therefore, the output signal O7 of the AND gate 15 is turned on.

The output signals O6 and O7 of the AND gates 14 and 15 are input to the OR gate 16. Thus, when the signal O6 is in the ON state and the signal O7 is in the OFF state, the output signal of the OR gate 16, i.e. the signal O8 indicative of continuation of slip is turned on. Thereafter, the signal O8 is turned off when the signal O7 has been turned off upon turning on of the output signal O3 of the evaluation circuit 7, namely when the slip speed signal $\lambda$ has become smaller than the threshold value $\lambda 2$ for recovery of slip.

Subsequently, the detection circuit 11 not only outputs the peak detection signal O4 as described above but latches the peak Dpeak so as to output the peak Dpeak to the circuit 17. The circuit 17 subtracts a predetermined evaluation value of $(+d)$ from the peak Dpeak and outputs the result Dwd of subtraction to the calculation circuit 18. In the calculation circuit 18, a deceleration change reference value Dl is calculated by setting the value Dwd as an initial value. The deceleration change reference value Dl is obtained by changing the value Dwd with an arbitrarily selected predetermined reduction ration $\gamma_o$. Thus, assuming that character t denotes time, the deceleration change reference value Dl is expressed as follows.

$$Dl = Dwd + \gamma_o t$$

Then, the circuit 19 evaluates the deceleration $\dot{V}w$ by using the reference value Dl as an evaluation reference, i.e. a threshold value so as to output the result of evaluation to the AND gate 21 by a logical signal O9.

If the signal O9 of ($\dot{V}w - Dl$) is in the OFF state, namely the deceleration $\dot{V}w$ is smaller than the reference value Dl when the signal O8 indicative of continuation of slip is in the ON state, an output signal O11 of the AND gate 21 is turned off, so that an output signal O10 of the AND gate 20 is turned on and thus, reduction of the braking pressure is continued.

When the deceleration $\dot{V}w$ has become larger than the reference value Dl, the signal O9 of the circuit 19 is turned on, so that the output signal O11 of the AND gate 21 is turned on and thus, the braking pressure is maintained at a constant value. Since the signal O11 is applied to a NOT terminal of the AND gate 20, the signal O10 is held in the OFF state while the signal O11 is in the ON state even if the signal O8 is in the ON state.

Meanwhile, when the signal O8 indicative of continuation of slip is turned off, both of the signals O10 and O11 are turned off. Although not specifically shown, this state represents a mode for increasing the braking pressure. Meanwhile, calculation of the value Dwd and the function Dl in the circuits 17 and 18 is started in response to detection of the peak Dpeak by the circuit 11 and is reset by the signal of the inverter 13.

Meanwhile, in this embodiment, the threshold values of (−b) and λ1 are, respectively, provided for the deceleration and the slip speed as conditions for turning on the signal O6 such that the signal O6 is turned on only when the deceleration and the slip speed satisfy the threshold values of (−b) and λ1, respectively at the same time. However, it can also be so arranged that the signal O6 is turned on under another condition. For example, the signal O6 may be turned on when either one of the deceleration and the slip speed satisfies the corresponding threshold value.

Furthermore, the circuit described in the above embodiment can be formed by hardware. In addition, functions identical with those of the circuit can be obtained by software incorporated into a microcomputer.

As is clear from the foregoing description, in the antiskid device of the present invention, the peak of the deceleration is detected during reduction of deceleration and then, the minimum recovery, i.e. (+d) from the peak of the deceleration is detected. Subsequently, a decision is made by the linear function Dl as to whether of not recovery of the deceleration from the peak progresses normally. Thus, only if the deceleration exceeds the linear function, the command of maintaining the braking pressure is issued.

Accordingly, in accordance with the present invention, such an undesirable phenomenon does not take place that the wheels are locked excessively through maintenance of the braking pressure in too early a stage or conversely that in the case of the wheels which could have been recovered from locking even if the braking pressure had been maintained in an earlier stage, the braking pressure is decreased exceedingly, whereby the wheels can be safely recovered from locking.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:
1. An antiskid brake control device comprising:
   a hydraulic brake circuit including a wheel cylinder for applying braking force to a vehicle wheel;
   a pressure control valve means disposed within said hydraulic brake circuit and operative, in its first position, to increase fluid pressure in said wheel cylinder, in its second position, to decrease the fluid pressure in said wheel cylinder and, in its third position, to hold the fluid pressure in said wheel cylinder constant;
   a wheel speed sensor means for detecting rotational speed of said vehicle wheel and producing speed pulses; and
   an electronic/electric control means, for producing first, second and third control signals which actuate said pressure control valve means in the first, second and third positions, respectively, so as to adjust the rotational speed of said vehicle wheel, said control means including:
   a wheel speed calculating means for calculating wheel speed based upon the speed pulses;
   a wheel acceleration calculation means for calculating wheel acceleration based upon a rate of change of the wheel speed;
   a vehicle speed estimating means for calculating vehicle speed based upon the wheel speed;
   a standard slip calculating means for calculating standard slip based upon the vehicle speed and the wheel speed;
   an excess slip calculating means for calculating an excess slip based upon the vehicle speed, the wheel speed and the standard slip;
   a peak detecting means for detecting a peak of deceleration of said vehicle wheel while said electronic/electric control means produces the second control signal;
   a deceleration/acceleration reference calculating means for calculating a deceleration/acceleration reference when the wheel acceleration exceeds the peak of deceleration by a predetermined value;
   a peak detecting means for detecting a peak of deceleration of said vehicle wheel while said electronic/electric control means produces the second control signal;
   a deceleration/acceleration reference calculating means for calculating a deceleration/acceleration reference when the wheel acceleration exceeds the peak of deceleration by a predetermined value;
   the deceleration/acceleration reference, Dl, being determined as a linear function of time, which has an initial value, Dwd, and is derived from $Dwd = Dpeak + d$ and $Dl = Dwd + Ct$ where C denotes a constant coefficient of the linear function and t denotes time measured from a point when the wheel acceleration reaches Dwl;
   an evaluating means for evaluating the excess slip by first and second predetermined thresholds, evaluat- ing the wheel acceleration by a third predetermined threshold and the deceleration/acceleration reference value so as to determine which one of the first, second and third control signals should be issued; and a solenoid driving circuit for driving, based upon the determined one of the first, second and third control signals, a solenoid coupled with said pressure control valve means;

wherein said evaluating means starts issuing the second control signal so as to decrease the fluid pressure in said wheel cylinder such that the rotational speed of said vehicle wheel is accelerated when at least one of the following occurs: the excess slip exceeds the first predetermined threshold and the wheel deceleration exceeds the third predetermined threshold;

wherein said evaluating means starts issuing the first control signal so as to increase the fluid pressure in said wheel cylinder such that the braking force of a vehicle is retrieved when the excess slip recovers into the second predetermined threshold greater than the first predetermined threshold after the peak of deceleration has been detected;

wherein said evaluating means effects change from the second control signal to the third control signal temporarily while the wheel acceleration exceeds the deceleration/acceleration reference value after the peak of deceleration has been detected;

2. An antiskid brake control device as claimed in claim 1, wherein said electronic/electric control means is constituted by analog and digital circuits.

3. An antiskid brake control device as claimed in claim 1, wherein said electronic/electric control means is constituted by analog and digital circuits using microcomputers having logical programs.

4. An antiskid brake control device as claimed in claim 1, wherein said pressure control valve means is a three position valve.

* * * * *